(12) United States Patent
Scott (10) Patent No.: US 7,182,994 B1
(45) Date of Patent: Feb. 27, 2007

(54) ACOUSTIC FLOOR MAT

(75) Inventor: Cooksey Timothy Scott, Coshocton, OH (US)

(73) Assignee: Pretty Products, Inc., Coshocton, OH (US)

( * ) Notice: Subject to any disclaimer, the term of this patent is extended or adjusted under 35 U.S.C. 154(b) by 171 days.

(21) Appl. No.: 10/338,240

(22) Filed: Jan. 8, 2003

(51) Int. Cl.
 *B32B 3/10* (2006.01)
(52) U.S. Cl. .................. 428/131; 428/156; 428/158; 428/161; 428/314.4; 428/316.6; 180/290; 180/291; 180/292; 180/293
(58) Field of Classification Search .............. 428/131, 428/314.4, 316.6, 85–97; 442/221–227, 442/370–375; 180/290, 291, 292, 293
See application file for complete search history.

(56) References Cited

U.S. PATENT DOCUMENTS

| 1,908,917 | A | | 5/1933 | Phillips |
| 2,113,128 | A | | 4/1938 | Cunnington |
| 2,116,771 | A | | 5/1938 | Seaman |
| 3,759,571 | A | * | 9/1973 | Korch ................ 297/445.1 |
| 3,886,620 | A | * | 6/1975 | Miller et al. ............. 15/217 |
| 3,940,811 | A | * | 3/1976 | Tomikawa et al. ........... 5/740 |
| 4,016,318 | A | | 4/1977 | DiGioia et al. |
| 4,128,683 | A | | 12/1978 | Nomura et al. |
| 4,186,230 | A | | 1/1980 | Sinclair et al. |
| 4,557,970 | A | | 12/1985 | Holtrop et al. |
| 4,579,764 | A | | 4/1986 | Peoples, Jr. et al. |
| 4,584,232 | A | | 4/1986 | Frank et al. |
| 4,673,605 | A | * | 6/1987 | Sias et al. ................ 428/120 |
| 4,715,473 | A | | 12/1987 | Tschudin-Mahrer |
| 4,894,275 | A | | 1/1990 | Pelzer |
| 5,876,826 | A | | 3/1999 | Hoffmann et al. |
| 5,886,305 | A | | 3/1999 | Campbell et al. |
| RE36,677 | E | | 5/2000 | Reuben |
| 6,204,209 | B1 | * | 3/2001 | Rozek et al. ............. 442/374 |
| 6,382,350 | B1 | * | 5/2002 | Jezewski et al. ............ 181/290 |
| 6,720,069 | B1 | * | 4/2004 | Murakami et al. ........ 428/319.3 |
| 6,921,502 | B1 | * | 7/2005 | Nord et al. ................ 264/46.4 |
| 2002/0142129 | A1 | * | 10/2002 | Chaudhry |
| 2003/0078309 | A1 | * | 4/2003 | Koffler |

FOREIGN PATENT DOCUMENTS

EP  1020846 A2 * 7/2000

* cited by examiner

*Primary Examiner*—Hai Vo
(74) *Attorney, Agent, or Firm*—Dinsmore & Shohl LLP (57) ABSTRACT

An acoustic floor mat is provided with a base layer, an upper surface, a lower surface, and a plurality of apertures configured to allow passage of acoustic transmissions therethrough. The base layer is further configured to provide a substantial barrier to the passage of liquid from the upper surface to the lower surface. Methods of making an acoustic floor mat are also disclosed.

8 Claims, 4 Drawing Sheets

ACOUSTIC FLOOR MAT

TECHNICAL FIELD

This invention relates generally to acoustic material, and more particularly, to an acoustic floor mat configured to allow passage of acoustic transmissions therethrough while being configured to provide a substantial barrier to the passage of liquid.

BACKGROUND OF THE INVENTION

Floor mats are currently implemented by the industry for a variety of useful applications. For example, floor mats are commonly placed over the floorboard of an automobile adjacent the driver and passenger seats to protect the floorboard and/or automobile carpeting from wear, liquid and/or debris.

Automobiles are also typically designed with structures in the floorboard for controlling unwanted noises while optimizing desirable sound such as on-board entertainment, safety features and the like. Conventional floor mats, which absorb acoustic waves in a non-selective manner, can actually diminish the automobile design by undermining the desired sound management system. Consequently, there is a need for a floor mat that is capable of facilitating selective acoustic transmission while providing a substantial barrier to the passage of liquid.

SUMMARY OF THE INVENTION

Accordingly, it is an aspect of the present invention to obviate problems and shortcomings of conventional floor mats.

In accordance with one aspect of the present invention, an acoustic floor mat is provided with a base layer including a material comprising a plurality of closed-cell interstitial voids, an upper surface, a lower surface, and a plurality of apertures configured to allow selective passage of acoustic transmissions therethrough. The base layer is further configured to provide a substantial barrier to the passage of liquid from the upper surface to the lower surface.

In accordance with another aspect of the present invention, an acoustic floor mat is provided with a base layer including an upper surface, a lower surface, a plurality of open-ended cavities defined in the lower surface, and a plurality of apertures configured to allow passage of acoustic transmissions therethrough. The base layer is further configured to provide a substantial barrier to the passage of liquid from the upper surface to the lower surface. The acoustic floor mat of this exemplary embodiment further comprise a face layer mounted adjacent the upper surface of the base layer and a padding layer positioned between the base layer and the face layer.

In accordance with yet another aspect of the present invention, methods of making an acoustic floor mat comprising a base layer including an upper surface and a lower surface, a padding layer and a face layer are provided. The methods include the steps of providing a mold body with a first mold section and a second mold section. The second mold section includes a plurality of protrusions extending from a surface of the second mold section. Each of the plurality of protrusions includes an apex that is offset from the surface. The methods further include the steps of positioning a base layer (e.g., wherein the base layer comprises a base layer material) over the second mold section such that the lower surface of the base layer contacts a plurality of the protrusions, positioning a padding layer over the base layer, and positioning a face layer over the padding layer. The methods further include the steps of compressing the base layer, the padding layer, and the face layer between the first mold section and the second mold section, wherein a plurality of open-ended cavities are formed in the lower surface of the base layer and wherein at least one apex of the plurality of protrusions forms an aperture in the upper surface of the base layer.

Still other aspects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF EXEMPLARY EMBODIMENTS

Figure 1:
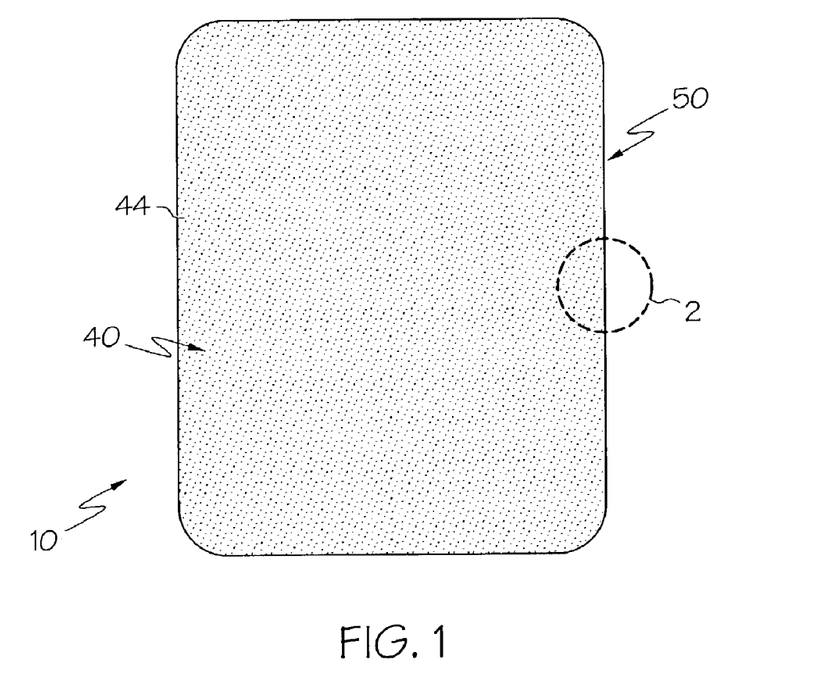
FIG. 1 is a top plan view of an acoustic floor mat in accordance with an exemplary embodiment of the present invention.

Turning now to the drawings in detail, wherein like numbers indicate the same or corresponding elements throughout the views, FIG. 1 depicts a top plan view of an acoustic floor mat 10 in accordance with one embodiment of the present invention. The upper surface of the floor mat includes a face layer 40. For example, as shown in FIG. 1, the face layer 40 of exemplary embodiments comprises a carpet material with a plurality of tufts extending away from a backing 42 to provide piles 44. If provided, the face layer of exemplary embodiments herein can also comprise any durable material that permits acoustic transmission therethrough. For example, the face layer can comprise a needle punch material (e.g., needle punch carpet, needle punch felt or the like), woven fabric, porous material or the like. While a substantially continuous and substantially uniform face layer is illustrated in the various exemplary embodiments, other non-continuous and/or non-uniform face layers may be employed. For example, the face layer can be rendered non-continuous by adding a wear resistant surface to a central portion of the floor mat. In one particular example, a rubber pad can be added to provide increased wear resistance at locations that might experience increased traffic. A non-uniform face layer can also be implemented to increase wear resistance. For instance, a high-traffic area of the floor mat can include a higher density of piles than a low-traffic area of the floor mat.

Figure 2:
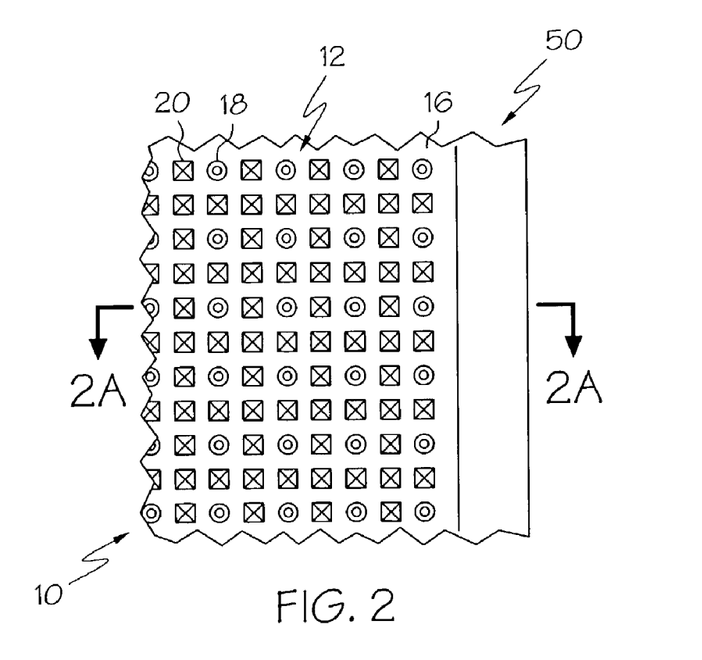
FIG. 2 is a partial bottom plan view of the acoustic floor mat of FIG. 1.

FIG. 2 is a partial bottom plan view of the acoustic floor mat of FIG. 1. A lower surface 16 of a base layer 12 can optionally define one or more open-ended cavities 20. Exemplary embodiments arrange a plurality of cavities 20 in a matrix format to optimize selective acoustic transmission through the base layer 12. Moreover, structures formed when making the cavities can assist in providing a substantial barrier to the passage of liquid therethrough, as will be understood and described further herein.

Figure 2A:
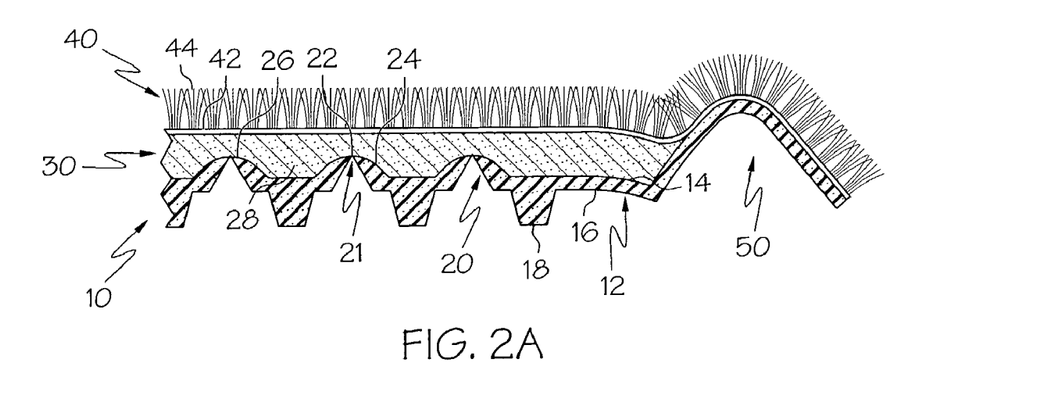
FIG. 2A is a sectional view along line 2A—2A of FIG. 2.

FIG. 2A is a sectional view of the floor mat 10 along line 2A—2A of FIG. 2. As shown, the base layer 12 includes an upper surface 14 and a lower surface 16 that can define the one or more cavities 20. The cavities 20, if provided, may have a variety of shapes and configurations. In one embodiment, the cavities are in the shape of a pyramid with an apex 21. As best illustrated in FIG. 2, for example, the cavities can substantially define a four-sided pyramid-shaped cavity. It is contemplated that the cavities can comprise pyramid shapes with three or more sides. In still further embodiments, the cavities may include other shapes such as a rectangular shaped cavity, a cube-shaped cavity, a cone-shaped cavity, frusto-conical shaped cavity, spherical-shaped cavity, cylindrical-shaped cavity or the like. The cavity shape can assist in one-way transmission of acoustic waves through the floor mat. For example, in use, the cavity shape can function to funnel acoustic waves passing through the cavities down toward the floorboard while redirecting undesirable reflected acoustic waves away from the automobile interior and back toward the floorboard.

As depicted in FIG. 2A, the thickness of the base layer 12 can advantageously be reduced at an upper surface of the cavities 20. For example, as illustrated in FIG. 2A, the thickness of the base layer 12 can be minimized near the apex 21 of the at least one of the cavities 20. An aperture, such as a pin hole 22, can extend from near the apex 21 of the cavity 20 to the upper surface 14 of the base layer.

Apertures through the base layer can allow acoustic transmission through the base layer. The aperture size and shape may be designed to facilitate selective acoustic frequency transmission through the base layer. Moreover, reducing the base layer thickness can also enhance transmission of acoustic signals through the base layer 12. For example, reducing the thickness of the base layer may allow the reduce thickness portions to vibrate when exposed to acoustic waves and/or resonate when exposed to predetermined acoustic wave frequencies. Thus, the reduced thickness portions can facilitate acoustic transmission and can also facilitate selective acoustic frequency transmission through the base layer by predetermining the natural frequency of the reduced thickness portions. Predetermining the natural frequency and/or the aperture characteristics can therefore "tune" the floor mat to facilitate transmission of acoustic waves with certain frequencies. A tuned floor mat may be useful, for example, to eliminate background noise while reflecting desirable sounds (e.g., on-board entertainment, safety features and the like).

A plurality of protrusions 24 may also be defined in the upper surface 14 of the base layer 12 to raise the elevation of the aperture opening. In exemplary embodiments, at least one of the protrusions 24 is located immediately above at least one of the plurality of cavities 20. The thickness of the base layer 12 can also be reduced at an upper portion of the protrusions. In further examples, the thickness of the base layer 12 can be minimized near an apex 26 of at least one of the protrusions. Moreover, an aperture, such as a pin hole 22, can extend from near the apex 26 of the protrusions 24 to the corresponding cavity 20 to provide an acoustic pathway therebetween. As further illustrated, an aperture, such as a pin hole 22, can extend from near the apex 26 of at least one of the protrusions 24 to near the apex 21 of at least one cavity 20. While it may be desired to provide openings near the apex of each of the cavities to maximize the acoustic volume where fluids can be passed through the mat, in some applications, more or less holes may be provided, or such openings might be arranged in a predetermined pattern for functional "tuning" of the mat. For example, in a winter-type mat, less holes might be desired where snow and slush will accumulate. In another example, holes might be desired for mats designed for automobiles with more acoustic elements in the floorboard such that the holes might be desired to direct sound and energy to those acoustic elements. Throughout this application "near the apex" of the protrusion or cavity can include locations at the apex, adjacent the apex, at an upper portion or the like.

As stated above, reducing the thickness of the base layer 12 and providing an aperture through the base layer 12 can assist in transmission of acoustic signals through the base layer 12. Moreover, providing protrusions 24 and an aperture (e.g., pin hole 22) near the apex 26 of the protrusion, raises the elevation of the aperture entrance above the surrounding valleys 28 defined in the upper surface 14 of the base layer 12. Accordingly, liquid introduced to the upper portion of the protrusions will tend to flow off the upper portion of the protrusions and thereafter away from the aperture entrance to accumulate in the surrounding valleys 28. Raising the elevation of the aperture entrance also reduces the fluid pressure in situations where the liquid level rises above the aperture entrance on the protrusions 24. Moreover, the pressure at the entrance of the aperture would be minimized if the aperture entrance is located at the apex 26 of the protrusion 24. Therefore, locating the entrance of the aperture near the apex of the protrusion can reduce pressure that could otherwise encourage fluid flow through the aperture 22. Moreover, if liquid has merely accumulated in the valleys, the liquid would have to essentially flow uphill to reach the aperture at an upper portion of the protrusion.

It should be understood, however, that the aperture may not be required to be located near the apex 26 of the protrusion 24. For example, it is contemplated that apertures may be located at a lower elevation. Whether located near the apex or at a lower elevation, an aperture may have a baffle, shingle arrangement, flap or other valve that may normally prevent or reduce fluid flow through the aperture.

Moreover, reducing the diameter or other dimension of the aperture (e.g., reducing the diameter of the apertures to form pin holes) can lower the flow rate and/or prevent the flow of liquid through the base layer 12. In further examples, reducing the thickness of the material and/or selection of a pliable material adjacent the aperture opening can provide flexible portions of material at least partially surrounding the aperture. Such a flexible aperture opening can provide an acoustic transmission function while acting as a one way liquid valve to facilitate configuration of the base layer to provide a substantial barrier to the passage of liquid through the base layer. For example, the weight of any fluid adjacent the flexible aperture opening may activate the material surrounding the aperture, thereby reducing the diameter of the aperture or substantially closing the aperture to inhibit liquid flow from the upper surface to the lower surface of the base layer.

As further illustrated in FIGS. 2 and 2A, in some applications one or a plurality of nibs 18 can extend downwardly from a lower surface 16 of the base layer 12 to provide a structural arrangement that can function to help anchor the floor mat on a support surface. For example, the nibs 18 and cavities 20, if provided, can be arranged in a matrix of alternating nibs and cavities to facilitate acoustic penetration and anchor function throughout the footprint of the floor mat. In one exemplary embodiment, the nibs 18 and cavities 20 can be arranged in rows and columns along a portion or substantially the entire footprint of the floor mat 10. As shown in FIG. 2, for example, each nib 18 may be completely surrounded by eight adjacent cavities 20. This arrangement can provide beneficial acoustic properties while still providing a nib anchoring function. It is contemplated that the nibs and cavities may be arranged in various alternative patterns while still applying the inventive concepts of the present invention. For example, the nibs may be provided only in certain locations of the mat to maximize the number of cavities while still providing a network of nibs to perform the anchoring function. For instance, the nibs may be provided at a greater concentration or entirely at the corners and/or along the periphery of the mat.

In still further examples, the lower surface of the mat may define a matrix of open-ended cavities without nibs to enhance acoustic transmission through the base layer by maximizing the number of apertures and/or cavities defined in the lower surface. In this example, the frictional resistance to movement of the mat may be sufficient to anchor the mat in its desired location. Alternatively, or in addition, the mats may be anchored to the support surface with one or more mechanical arrangements such as fasteners. For example, the corners of the floor mat may include one or more apertures provided with grommets adapted to receive a fastening device through the aperture to anchor the floor mat on a support surface.

The base layer 12 may be formed from a variety of materials. In certain embodiments, the base layer can comprise a thermoplastic backing without interstitial voids. In other embodiments, as shown in the figures for example, the base layer 12 can include a material comprising a plurality of closed-cell interstitial voids. For example, the material can comprise a closed-cell foam rubber. In exemplary embodiments of automobile mats made according to the invention, the material might comprise a SBR foam rubber or other material with an additive that can cause heat-activated aeration or controlled foaming of the material to form the closed-cell interstitial voids during the molding process. The closed-cell nature of such material can cause the base layer 12 to be substantially fluid resistant. Moreover, the interstitial voids provide a lighter-weight floor mat while increasing the pliability of the base layer 12 to allow the floor mat 10 to conform to the support surface and to reduce inadvertent breaking of nibs from the remainder of the base layer. As discussed below, utilization of material with closed-cell interstitial voids can also facilitate the molding process. Thus, the unique closed-cell feature of the base layer material can provide the floor mat with excellent fluid transmission resistance, a lighter overall weight or bulk, and improved moldability while still providing sufficient strength to allow integral molding of the nibs or other relatively fine structural details.

Although not shown, the closed-cell material may be limited to a relatively thin layer of closed-cell material. For example, a lower sub-layer of the base layer may comprise closed-cell material while an upper sub-layer may comprise a liquid permeable material (e.g., an open-cell material). Additional embodiments might include a gradient of material beginning with closed-cell material on the bottom and leading to open-cell material on the top. Manufacturing the upper sub-layer from an open-cell material may allow limited fluid absorption and facilitate rapid evaporation while the closed-cell nature of the lower sub-layer can inhibit complete penetration of liquid through the base layer. In addition, fabricating the upper sub-layer from an open-cell material may facilitate acoustic absorption to prevent undesirable reflection of sound waves back toward the vehicle interior.

The acoustic floor mat 10 of FIG. 2A can also include an optional padding layer 30 to reduce manufacturing complications while enhancing the acoustic absorption properties of the floor mat. While such a padding layer (e.g., 30) is not necessary for carrying out many of the principles of the present invention, it can be utilized to enhance the acoustic absorption properties of the floor mat 10. The padding layer 30 can also add desirable rigidity and, as described more fully below, may help protect fragile portions of a tool during the molding process. The optional padding layer 30 may comprise a fibrous material, such as felt or the like, to enhance the acoustic energy absorption capabilities of the floor mat. The padding layer can also comprise an open cell foam material or the like. The choice of materials and thickness can be used to selectively "tune" the mat to optimize its acoustic absorption, reflection and transparency in use. For example, a fibrous material may be selected with a relatively small fiber size to enhance the acoustic absorption properties of the floor mat. One exemplary padding layer 30 may comprise a felt layer including a mix of approximately 75% polyester with approximately 25% polypropylene.

The face layer 40, if provided, may comprise a variety of materials as described above. In one exemplary embodiment, as illustrated in the example of FIG. 2A, the face layer 40 may comprise a tufted carpet wherein a backing 42 locks a plurality of tufts in place; thereby creating a face surface with a plurality of piles 44. The backing 42 might comprise a porous polyester mesh adapted to receive the tufts therein. After tufting the tufts through the backing, a latex layer may then be applied to the rear surface of the backing 42 to lock the tufts in place. Although many different materials may be applied to the rear surface of the backing 42 to facilitate locking of the tufts, a latex precoat (e.g., FC423 latex precoat by Lile Industries) may provide a water resistant latex that is porous enough to allow transmission of air and acoustic waves while the pores are small enough to resist water leaks through the face layer.

If provided, the padding layer may be constructed so that it extends between the base layer 12 and the face layer 40. As shown in the exemplary embodiment of FIG. 2A, the padding layer 30 does not need to extend to the peripheral edge 50 of the floor mat 10. Rather, the padding layer 30 extends between the face layer 40 and base layer 12 in central portions of the mat without extending into the peripheral edge portion of the mat. The costs of material may be reduced by providing a padding layer 30 with reduced dimensions so that it merely fits into the central portion of the floor mat 10. Furthermore, the padding layer 30 can still be effective to selectively absorb acoustic waves and to protect fragile portions of a tool during manufacture as the padding layer will be positioned above the apertures 22. For example, the padding layer 30 can help protect protrusions of a mold section used to form the open-ended cavities 20 defined by the lower surface 16 of the base layer 12.

Figure 2B:
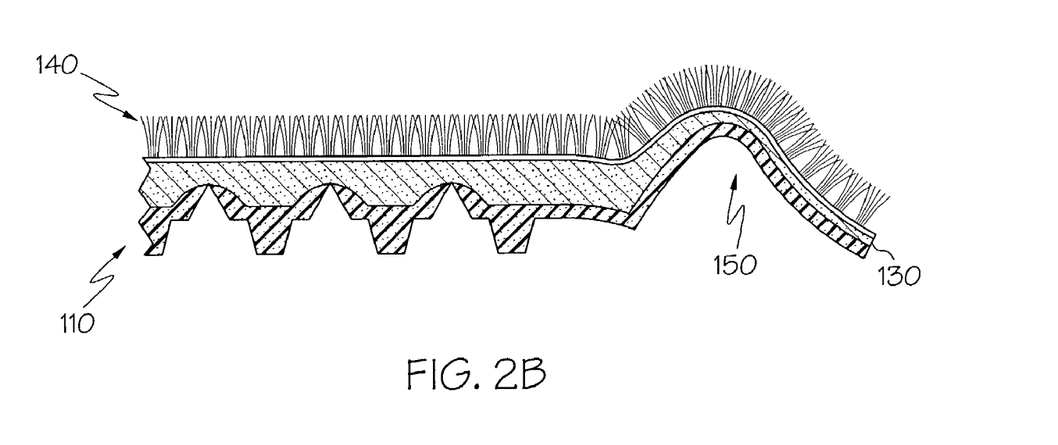
FIG. 2B is a sectional view of an acoustic floor mat in accordance with another exemplary embodiment of the present invention.

FIG. 2B depicts another embodiment of an acoustic floor mat 110 in accordance with the present invention. As shown, the acoustic floor mat 110 is essentially identical to the acoustic floor mat 10 discussed above except that the padding layer 130 extends to the outer edge of the peripheral edge 150. Providing each layer with essentially the same size may simplify the manufacturing process and increase product uniformity by preventing the assembly worker from having to undergo a timely alignment process of the padding layer 130. Moreover, the manufacturing time may further be reduced by using the same die cutting mechanism for each layer.

Various methods might be used to make the acoustic floor mat (e.g., as seen in the various figures) in accordance with the principles of the present invention. In one exemplary method, the face layer (e.g., 40, 140, 240) is cut into shape. For example, the face layer may be die cut with a die cutting mechanism to obtain uniform dimensions and to reduce manufacturing costs.

A padding layer 30 is selected, and might comprise an 18±2 ounce sized felt layer for an automotive floor mat, for example. A layer of adhesive is applied to one side of the padding layer 30. For example, the adhesive can be a hot melt adhesive such as a FIRESTONE 841A STEREON hot melt adhesive material. The padding layer 30 may be cut into shape before or after the adhesive is applied. When providing the padding layer 130 with the same dimensions as the face layer (e.g., see FIG. 2B), the die cutting mechanism used to cut the face layer may also be used to cut the padding layer to maintain uniform peripheral dimensions. A smaller die cut mechanism may also be employed to create a padding layer with reduced dimensions to create a floor mat as depicted in FIG. 2A.

As mentioned, the base layer 12 might comprise a layer of SBR foam rubber or other material with an aeration additive (e.g., an aerating agent) that can cause heat-activated aeration of the material to form the closed-cell interstitial voids during the molding process. It is contemplated that the additive might not be heat activated. For example, application of pressure, adding an additional agent for aeration reaction with the additive, or other methods can be used to facilitate the formation of a closed-cell material. However, a heat activated additive may be desirable to initiate formation of the closed cells when heating is used to combine the mat layers. Although other thicknesses may also be used, in one example of an automotive mat application, the base layer (e.g., SBR foam rubber layer) may be between 0.045 and 0.050 inches thick prior to the molding process. This base layer 12 can also be cut, for example, with the die cut mechanism used to cut the face layer to obtain a base layer with uniform peripheral dimensions.

Figure 5:
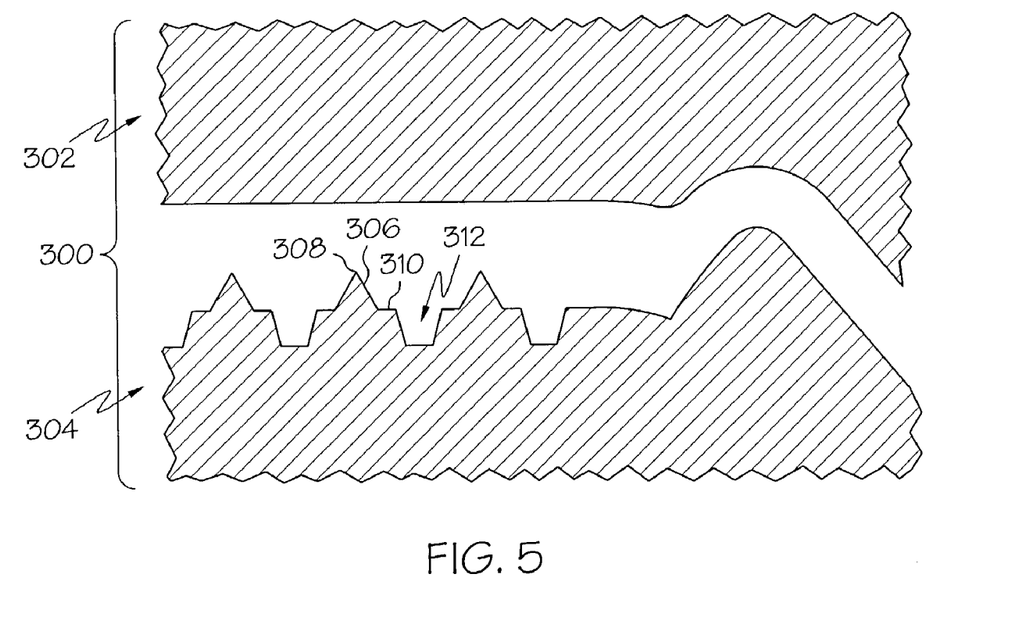
FIG. 5 is a partial sectional view of a mold body in accordance with an exemplary embodiment of the present invention.

Once the layers are ready, a mold body 300 can be used to mold the floor mat with its desirable features. As shown in FIG. 5, such a mold body 300 might advantageously include a first mold section 302 and a second mold section 304. In an illustrative example, the second molded section 304 includes a protrusion 306 with an apex 308, a surface 310 and a cavity 312 defined in the surface. It will be understood that the cavities can be removed and might even be replaced with additional protrusions 306 for embodiments without nibs. The first and second sections of this exemplary mold section are designed for high compression molding under elevated temperatures.

When using the mold body 300, the base layer 12 is placed on the upper surface of the second mold section 304. The padding layer 30 is then placed over the base layer 12 with the STEREON adhesive layer facing away from the base layer 12. The face layer 40 is then placed over the padding layer 30 and against the STEREON adhesive layer. The mold body 300 then compresses the layers together at a pressure of about 1000–1500 psi with the first mold 302 being maintained at a temperature of about 75° F. to about 100° F. while the second mold 304 is maintained at a temperature of about 350° F. The lower temperature of the upper mold section is advantageous in this example to minimize potential damage to artificial carpet tufts of the face layer of carpeted mats. During this process, the base layer forms a plurality of closed-cell interstitial voids and becomes attached to the padding layer as it is being molded. The interstitial voids tend to assist in the molding process by requiring less pressure to obtain the desired shape during the molding process and to assist in filling the smaller cavities forming details of the floor mat (e.g., relatively small cavities that form the nibs).

During the molding process, the padding layer 30 also assists in protecting the pointed tips at the apex 308 of the protrusions 306. In fact, the tips of the apex 308 may completely pass through the base layer 12 and into the padding layer 30 when forming the pin holes 22 in the base layer 12. In certain mold formations, the padding layer 30 may then protect the tip against damaging abutment with the first mold section 302. Moreover, the padding layer 30 further assists in preventing damage to the mat that might otherwise result from being overly compressed in the mold.

The layers are molded together in this example with the mold body 300 for approximately 3½ minutes prior to removing the floor mat from the mold body. While the layers are being molded together, the protrusions 306 press up against the lower surface of the base layer, thereafter molding the base layer. The lower surface conforms to the protrusions such that the lower surface defines the plurality of poen-ended cavities. The apex 308 of the protrusions can form pin holes through the base layer at the apex of the cavities. Although not shown, pins may extend from the upper portion of the protrusions 306 to facilitate formation of the pin holes. Pins may be particularly useful in circumstances where the protrusions 306 are blunted. For example, to form open-ended cavities in the shape of a cube or cylinder, the protrusions 306 could be substantially cube or cylinder shaped with a flat upper surface having a protrusion extending upwardly therefrom. In addition, the pin could be movable with respect to the protrusion to permit extension of the pin to form the pin hole during the molding process while allowing retraction of the pin within the protrusion after forming the pinholes. Retraction of the pin may protect the pin when the mold is not in use.

After the floor mat is removed from the mold, it can be further refined to remove imperfections extending beyond the final periphery of the floor mat. For example, after the floor mat is removed and cooled, the periphery of the floor mat can be cut (e.g., die cut) to remove excess material.

As mentioned, various methods for making the acoustic floor mats described herein are exemplary in nature. It is understood that other methods of making may be used to create floor mats in accordance with the present invention. For example, the method of making the floor mat may include an injection molding procedure to form the base layer with the desired shape. In one particular example, the base layer may be injection molded at a low pressure to facilitate formation of interstitial voids. A wide range of thermoplastic materials may also be used with such an injection molding process. Exemplary materials might include a thermoplastic olefin ("TPO"), a thermoplastic rubber ("TPR"), polyethylene, polypropylene, or the like.

The method of making the acoustic floor mat may also include the step of extruding the floor mat. For example, the material layers may be passed through extrusion rollers. In one particular example, a substantially smooth upper roller may be used in combination with a lower roller having an outer surface formed with protrusions and/or cavities sufficient to provide the base layer with the desired structural features in accordance with the present invention.

Figure 3:
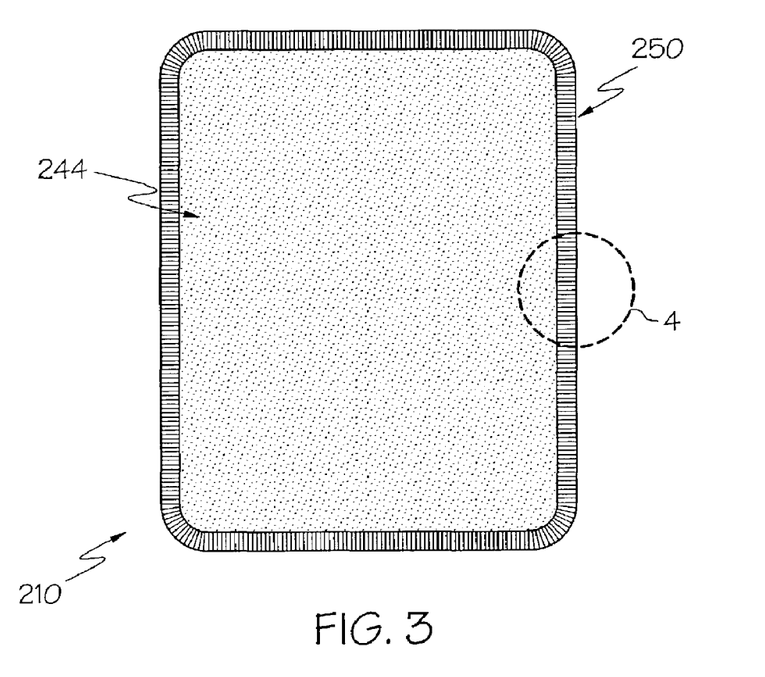
FIG. 3 is a top plan view of an acoustic floor mat in accordance with yet another embodiment of the present invention.
Figure 4:
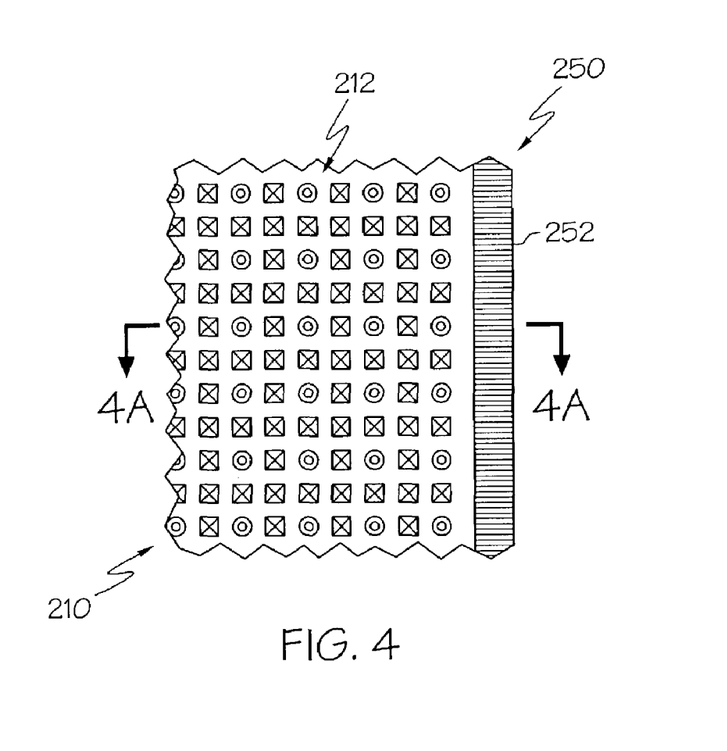
FIG. 4 a partial bottom plan view of the acoustic floor mat of FIG. 3.
Figure 4A:
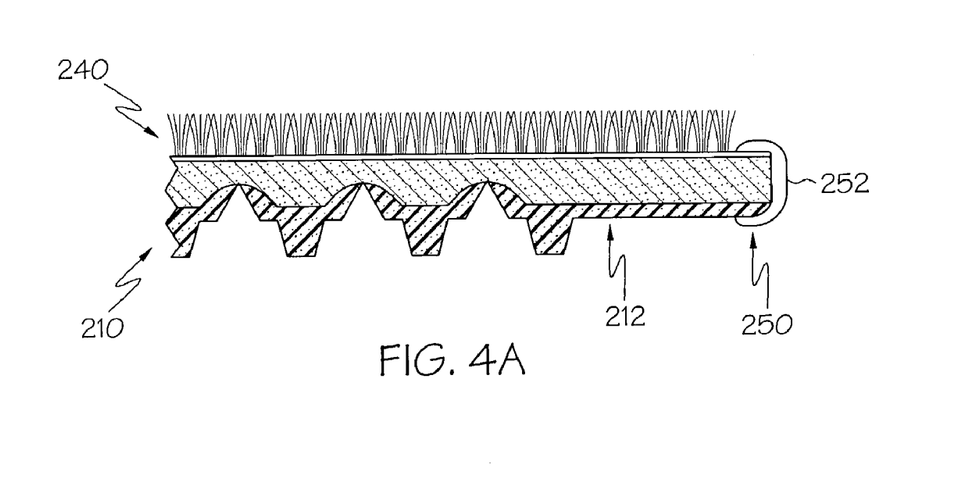
FIG. 4A is a sectional view along line 4A—4A of FIG. 4.

FIGS. 3, 4, and 4A depict an acoustic floor mat 210 in accordance with another embodiment of the present invention. The acoustic floor mat 210 is similar in structure to the acoustic floor mats described above except that the peripheral edge 250 is formed with a spiral hem 252. Moreover, processes of making the floor mat 210 can be similar to the processes of making the floor mat 110 depicted in FIG. 2B except that the mold body might not include a final peripheral shape to form the peripheral edge 150. Rather, as shown, the peripheral edge 250 can be formed as a generally linear section. In alternative embodiments, the edge can be curved as shown in FIGS. 2A and 2B to provide a peripheral barrier to inhibit fluid flow from the mat to the surrounding support surface. After molding, the molded piece can also be refined to remove imperfections extending beyond the final periphery of the floor mat. Next, a spiral hem 252 may be formed on the outer periphery to finish the final periphery of the floor mat 210, thereby preventing and/or discouraging separation of the layers at the periphery and providing an aesthetically pleasing floor mat.

While the exemplary acoustic floor mats (10, 210) illustrated in FIGS. 1 and 2 are rectangular in shape, the mats can comprise a variety of shapes depending on the anticipated use of the floor mats. For example, exemplary floor mats may be circular, elliptical, a polygonal shape having three or more sides, or the like. Moreover, while the mats illustrated in the figures are generally planar, other three-dimensional shapes may be produced to easily conform with the support surface (e.g., floorboard) in use.

The foregoing description of the various examples and embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. An acoustic floor mat comprising:
   a) a base layer including upper surface, a lower surface, a plurality of protrusions defined in the upper surface and a plurality of nibs extending from the lower surface configured to reduce movement of the floor mat about a vehicle floor, wherein the thickness of the base layer is reduced at an upper portion of at least one protrusion, wherein the base layer further includes a plurality of apertures positioned to allow passage of acoustic transmissions therethrough, and wherein said base layer apertures are located within the protrusions and only extend from said lower surface of said base layer through said upper surface of said base layer;
   b) a face layer comprising a carpet mounted adjacent the upper surface of the base layer; and
   c) a padding layer positioned between the base layer and the face layer, at least one surface of the padding layer having the shape of the respective protrusions.

2. The acoustic floor mat of claim 1, wherein the padding layer comprises fibrous material.

3. The acoustic floor mat of claim 1, wherein each protrusion has an upper and lower surface and the lower surface of each protrusion defines an open-ended cavity, wherein each cavity is provided with at least one of the apertures for communication between the cavity and the upper surface of the base layer.

4. The acoustic floor mat of claim 3, wherein a plurality of the open-ended cavities comprise a pyramid shaped cavity with an apex spaced from the upper and lower surfaces.

5. The acoustic floor mat of claim 4, wherein at least one of the pyramid shaped cavities is provided with an aperture extending from near the apex of the cavity to the upper surface of the base layer.

6. The acoustic floor mat of claim 4, wherein the thickness of the base layer is minimized near an apex of at least one of the cavities.

7. The acoustic floor mat of claim 6, wherein at least one of the plurality of aperture comprises a pin hole.

8. The acoustic floor mat of claim 1, wherein the base layer includes a material comprising a plurality of closed-cell interstitial voids.

\* \* \* \* \*

UNITED STATES PATENT AND TRADEMARK OFFICE
CERTIFICATE OF CORRECTION

| | |
|---|---|
| PATENT NO. | : 7,182,994 B1 |
| APPLICATION NO. | : 10/338240 |
| DATED | : February 27, 2007 |
| INVENTOR(S) | : Timothy Scott Cooksey |

It is certified that error appears in the above-identified patent and that said Letters Patent is hereby corrected as shown below:

On Title Page
item 75
Inventor's Name, change "Cooksey Timothy Scott" to -- Cooksey, Timothy Scott --.

Signed and Sealed this

First Day of May, 2007

JON W. DUDAS
*Director of the United States Patent and Trademark Office*